(12) United States Patent
Linzer (10) Patent No.: US 10,846,829 B1
(45) Date of Patent: Nov. 24, 2020

(54) IMAGE SHARPENING WITH EDGE DIRECTION BASED UNDERSHOOT AND OVERSHOOT REDUCTION

(71) Applicant: Ambarella International LP, Santa Clara, CA (US)

(72) Inventor: Elliot N. Linzer, Bergenfield, NY (US)

(73) Assignee: Ambarella International LP, Santa Clara, CA (US)

( * ) Notice: Subject to any disclaimer, the term of this patent is extended or adjusted under 35 U.S.C. 154(b) by 275 days.

(21) Appl. No.: 15/883,604

(22) Filed: Jan. 30, 2018

(51) Int. Cl.
*G06T 5/00* (2006.01)
*G06T 7/13* (2017.01)

(52) U.S. Cl.
CPC ............... *G06T 5/003* (2013.01); *G06T 7/13* (2017.01); *G06T 2207/20192* (2013.01)

(58) Field of Classification Search
CPC .... G06T 5/003; G06T 7/13; G06T 2207/2019
See application file for complete search history.

(56) References Cited

U.S. PATENT DOCUMENTS

| | | | | |
|---|---|---|---|---|
| 5,880,767 A * | 3/1999 | Liu | ........................ | G06T 5/004 347/251 |
| 6,535,632 B1 * | 3/2003 | Park | ........................ | G06K 9/32 358/515 |
| 2005/0135701 A1 * | 6/2005 | Atkins | .................... | G06T 5/002 382/274 |
| 2006/0192897 A1 * | 8/2006 | Morphet | ................... | G06T 7/12 348/625 |
| 2008/0298712 A1 * | 12/2008 | Kang | ................. | H04N 5/23229 382/266 |
| 2009/0046944 A1 * | 2/2009 | Bilcu | ..................... | H04N 9/045 382/274 |
| 2009/0148062 A1 * | 6/2009 | Gabso | .................... | H04N 19/61 382/266 |

OTHER PUBLICATIONS

Jaspers et al. ("A generic 2D sharpness enhancement algorithm for luminance signals," IEEE Sixth International Conference on Image Processing and Its Applications, Jul. 14-17, 1997) (Year: 1997).*

Toh et al. ("Locally adaptive bilateral clustering for image deblurring and sharpness enhancement," IEEE Transactions on Consumer Electronics ( vol. 57, No. 3, Sep. 15, 2011) (Year: 2011).*

(Continued)

*Primary Examiner* — Yubin Hung
(74) *Attorney, Agent, or Firm* — Christopher P. Maiorana, PC (57) ABSTRACT

An apparatus includes a first circuit and a second circuit. The first circuit may be configured to (i) generate a sharpened region by sharpening an original region of an image and (ii) generate edge information by detecting an edge in the original region of the image. The second circuit may be configured to (i) evaluate a current sample of the sharpened region proximate to the edge for an artifact based on the edge information and (ii) generate a final sample by adjusting the current sample in the sharpened region where the artifact is detected. The artifact may be an overshoot or an undershoot.

19 Claims, 6 Drawing Sheets

(56) References Cited

OTHER PUBLICATIONS

Cvetkovic et al. ("Locally-Adaptive Image Contrast Enhancement without Noise and Ringing Artifacts," IEEE International Conference on Image Processing, Sep. 16-Oct. 19, 2007) (Year: 2007).*
Mirel et al. ("Isotropic edge enhancement with halo control," 10th International Symposium on Electronics and Telecommunications, Nov. 15-16, 2012) (Year: 2012).*
Cho et al. ("Edge-adaptive local min/max nonlinear filter-based shoot suppression," IEEE Transactions on Consumer Electronics, vol. 52, No. 3, Aug. 2006) (Year: 2006).*

* cited by examiner

IMAGE SHARPENING WITH EDGE DIRECTION BASED UNDERSHOOT AND OVERSHOOT REDUCTION

FIELD OF THE INVENTION

The invention relates to digital cameras generally and, more particularly, to a method and/or apparatus for implementing image sharpening with edge direction based undershoot and overshoot reduction.

BACKGROUND

Conventional video sharpening techniques boost high frequency components of video images. Sharpening is commonly applied to luminance components and can make the images more visually pleasing. However, strongly applied sharpening can lead to visual artifacts. Two such artifacts are overshoot and undershoot. An overshoot is where an extended area of brighter-than-desired pixels exists on a bright side of an edge. An undershoot is where an extended area of darker-than-desired pixels exists on a dark side of the edge.

It would be desirable to implement image sharpening with edge direction based undershoot and overshoot reduction.

SUMMARY

The invention concerns an apparatus including a first circuit and a second circuit. The first circuit may be configured to (i) generate a sharpened region by sharpening an original region of an image and (ii) generate edge information by detecting an edge in the original region of the image. The second circuit may be configured to (i) evaluate a current sample of the sharpened region proximate to the edge for an artifact based on the edge information and (ii) generate a final sample by adjusting the current sample in the sharpened region where the artifact is detected. The artifact may be an overshoot or an undershoot.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing image sharpening with edge direction based undershoot and overshoot reduction that may (i) reduce unwanted halo effects created by sharpening-induced overshoots, (ii) reduce unwanted halo effects created by sharpening-induced undershoots, (iii) reduce strong sharpening in some regions but not all regions, and/or (iv) be implemented as one or more integrated circuits.

Undershoot and overshoot generally makes images look sharper. If an amplitude of an overshoot or an undershoot is large and spatially extends well beyond a high-contrast edge and/or texture edge, the sharpening may create a visually unpleasant halo effect. Various embodiments of the invention may reduce such halo effects while not reducing the sharpening that does not cause such visually unpleasant effects. The undershoot and/or overshoot reduction is generally based on distances from the edges and/or edge magnitude.

Each image processed by the invention may comprise an array of samples (or pixels). The samples may be organized as multicolor samples and/or as separated luminance and chrominance samples. A "center sample" or "current sample" generally refers to a sample being sharpened. Each center sample may be spatially located at a center of a region being examined to determine if the sharpening should be reduced to reduce visually annoying undershoot and/or overshoot.

A technique implemented by the invention may identify local edge directions. The technique may subsequently determine if the edge is a high contrast edge (e.g., one side is much darker/brighter than the other) and if the center sample is not close the edge. If both are true, the technique may conclude that sharpening the center sample may result in a displeasing overshoot or undershoot. Where the edge is high contrast, the sharpening may create a large overshoot or undershoot. Because the center sample is not that close to the high-contrast edge, significant sharpening may cause the over or undershoot to extend over a wide distance from the edge. Therefore, if both conditions are true, the technique may reduce the sharpening strength using the original image samples.

Figure 1:
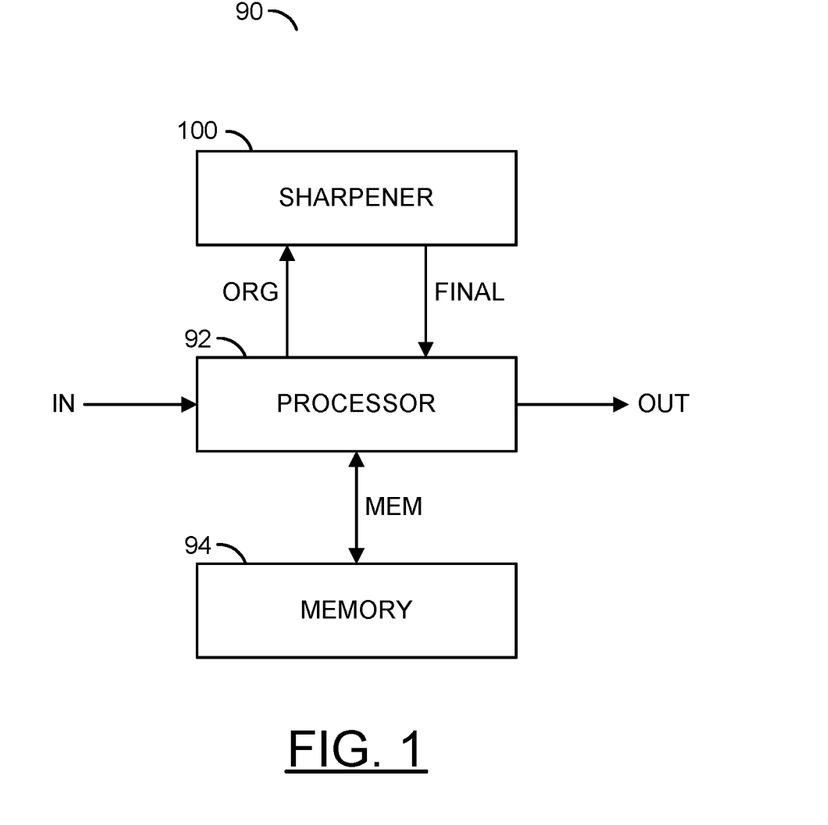
FIG. 1 is a block diagram of an apparatus.

Referring to FIG. 1, a block diagram of an example implementation of an apparatus 90 is shown. The apparatus (or circuit or device or integrated circuit) 90 may implement a video processing system. The apparatus 90 generally comprises a block (or circuit) 92, a block (or circuit) 94 and a block (or circuit) 100. The circuits 92 to 100 may be implemented in hardware, software, firmware or any combination thereof in an apparatus. In some embodiments, the apparatus 100 may be a digital video camera, a digital still camera, a hybrid digital video/still camera, display monitor, television and/or a post processing system. Other video standards may be implemented to meet the design criteria of a particular application.

The circuit 92 may be directly coupled with the circuit 94 to exchange data and control information in a bidirectional signal (e.g., MEM). An input signal (e.g., IN) may be received by the circuit 92. The signal IN may convey a video signal. An output signal (e.g., OUT) may be presented by the circuit 92. The signal OUT may carry a processed version the video signal. In an example embodiment, the processed version of the digital video signal may be a sharpened version. A signal (e.g., ORG) may be transferred from the circuit 92 to the circuit 100. The signal ORG may carry original (unprocessed) images. A signal (e.g., FINAL) may be generated by the circuit 100 and presented to the circuit 92. The signal FINAL may convey the images after undergoing an image sharpening process.

The signal IN or OUT may be one or more analog video signals and/or one or more digital video signals. Each signal IN and OUT generally comprises a sequence of progressive-format frames and/or interlace-format fields. The frames and/or fields may also be referred to as images and/or pictures. The analog/digital video signals may include synchronization signals suitable for synchronizing the video information. The analog video signals may be presented in analog form as, but not limited to, an RGB (Red, Green, Blue) signal, an EIA-770 (e.g., YCrCb) signal, an S-video signal and/or a composite video baseband signal (e.g., CVBS). In digital form, the video signals may be presented as, but is not limited to, a high definition multimedia interface (e.g., HDMI) signal, a digital video interface (e.g., DVI) signal and/or a BT.656 signal. The video signals may be formatted as a standard definition signals and/or a high definition signals.

The circuit 92 may be implemented as a processor circuit. The processor circuit 92 may be operational to perform digital video enhancement operations on the data received in the signal IN. The enhancement operation may include, but are not limited to, sharpening, decimation filtering, interpolation, formatting, color space conversions, color corrections, tone corrections, gain corrections, offset corrections, black level calibrations, white balancing, image sharpening, image smoothing, and the like.

The circuit 92 generally comprises one or more digital signal processors (or cores). The processor circuit 92 may be fabricated as an integrated circuit in (on) a single chip (or die). In some embodiments, the circuits 92, 94 and/or 100 may be fabricated in (on) the same chip. In other embodiments, the circuits 92, 94 and 100 may be fabricated in (on) separate chips.

The circuit 94 may be implemented as a dynamic random access memory (e.g., DRAM). The memory circuit 94 may be operational to store or buffer large amounts of information consumed and generated by the processing operations of the apparatus 90. As such, the memory circuit 94 may be referred to as a main (or external) memory. The memory circuit 94 may be implemented as a double data rate (e.g., DDR) memory. Other memory technologies may be implemented to meet the criteria of a particular application. The memory circuit 94 may be fabricated as an integrated circuit in (on) a single chip (or die). In some embodiments, the circuits 92, 94 and 100 may be fabricated together in (on) a single chip.

The circuit 100 may implement a sharpener circuit. The sharpener circuit 100 is generally operational to apply a sharpening process to each image received in the video signal ORG. The technique performed by the sharpener circuit 100 may use one or more normal sharpening processes, one or more normal edge detection processes, and a process that may weaken (or limit) the sharpening. The weakening may be based on an edge direction and a determination if a strong sharpening would result in visually annoying (or unpleasant) undershoot and/or overshoot. The sharpened images may be presented back to the processor circuit 92 via the signal FINAL. The sharpener circuit 100 may be fabricated as an integrated circuit in (on) a single chip (or die). In some embodiments, the circuits 92, 94 and 100 may be fabricated together in (on) a single chip.

Figure 2:
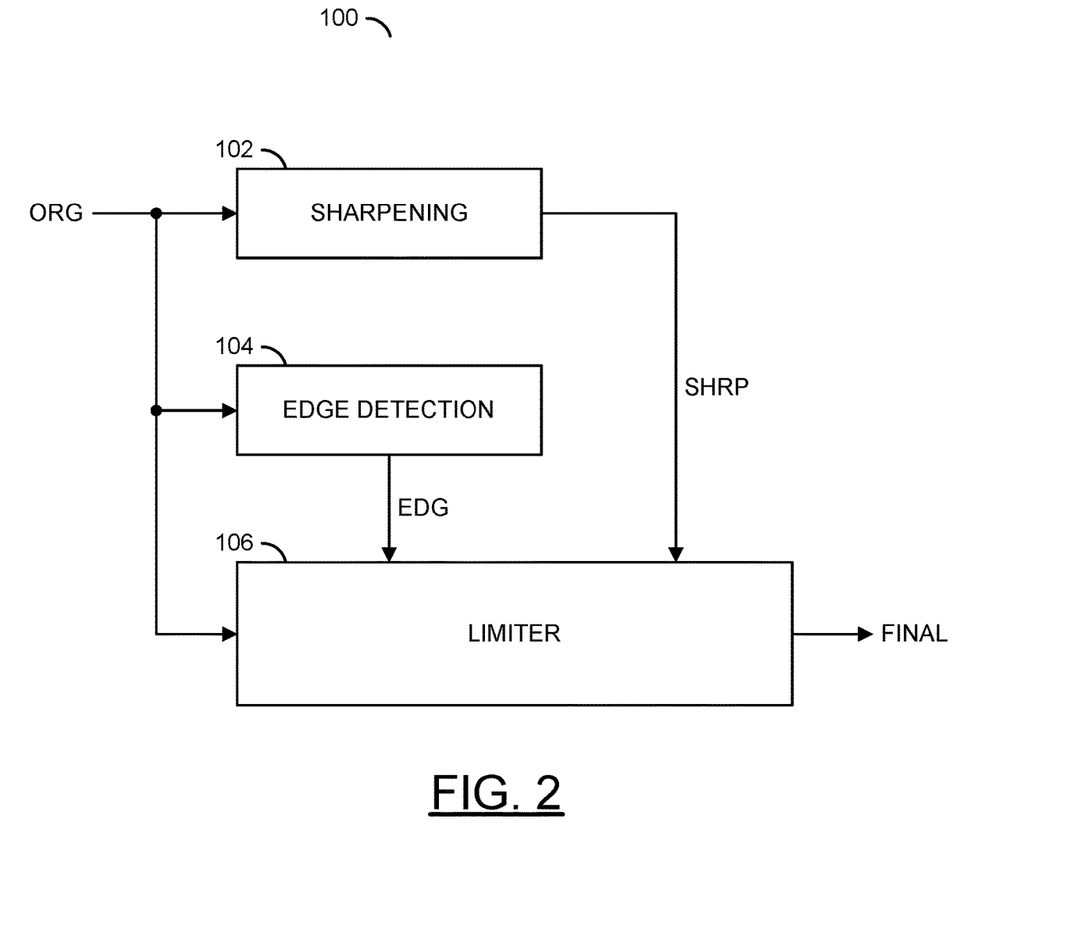
FIG. 2 is a block diagram of a sharpener circuit in accordance with an embodiment of the invention.

Referring to FIG. 2, a block diagram of an example implementation of the sharpener circuit 100 in accordance with an embodiment of the invention is shown. The sharpener circuit 100 generally comprises a block (or circuit) 102, a block (or circuit) 104 and a block (or circuit) 106. The circuits 102 to 106 may be implemented in hardware, software, firmware or any combination thereof in an apparatus.

The signal ORG may be received by all of the circuit 102, the circuit 104 and the circuit 106. The signal FINAL may be generated by the circuit 106. A signal (e.g., EDG) may be generated by the circuit 104 and received by the circuit 106. The signal EDG may convey locations and directions of edges in areas of the original images received in the signal ORG. A signal (e.g., SHRP) may be generated by the circuit 102 and received by the circuit 106. The signal SHRP may contain sharpened versions of the original images received in the signal ORG.

The circuit 102 may implement a sharpening circuit. The sharpening circuit 102 is generally operational to sharpen edges and other details in the original images received in the signal ORG. The sharpening operation may be implemented with common processes. The sharpening processes may be include, but is not limited to, one or more of high pass filter sharpening, edge enhancement, noise removal and deconvolution. In various embodiments, the sharpening process may be applied sequentially to multiple regions within each image. In other embodiments, the sharpening process may be applied to entire images at a time. In some instances, the sharpened regions and/or sharpened images may include overshoot areas and/or undershoot areas. The sharpened images may be presented to the circuit 106 in the signal SHRP.

The circuit 104 may implement an edge detection circuit. The edge detection circuit 104 is generally operational to detect the presence, location and direction of all edges in the original images received in the signal ORG. The edge detection process may be implemented with common processes. In various embodiments, the edge detection process may be applied sequentially to multiple regions within each image. In other embodiments, the edge detection process may be applied to entire images at a time. The location and direction of the detected edges may be reported to the circuit 106 via the signal EDG.

The edge detection circuit 104 may be configured to identify local edge directions. In various embodiments, the local edges may be detected in any one of multiple (e.g., 8) direction. For example, the edge directions may be horizontal (0 degrees), atan(½) (~26.6 degrees), atan(1) (45 degrees), atan(2) (~63.4 degrees), atan(1/0) (90 degrees), atan(−2) (~116.6 degrees), atan(−1) (135 degrees), atan(−2) (~153.4 degrees). Other numbers and other directions of the detected edges may be implemented to meet the design criteria of a particular application.

The circuit 106 may implement a limiter circuit. The limiter circuit 106 is generally operational to weaken the sharpening created by the sharpening circuit 102 based on the edge directions determined by the edge detection circuit 104. The limiter circuit 106 may also be operational to determine if the sharpening process performed by the sharpening circuit 102 resulted in artifacts (e.g., visually annoying undershoot and/or overshoot) in any of the regions and/or entire images. If the sharpening process does create artifacts, the limiter circuit 106 may weaken the sharpening is such areas to reduce and/or eliminate the artifacts.

In various embodiments, the limiter circuit 106 may be operational to determine an edge is a high-contrast edge where samples on opposite sides of the edge have significantly different amplitudes (e.g., significantly different luminance values). The limiter circuit 106 may also be operational to determine if the center sample is not close the edge (e.g., greater than one or two pixels distances away from the edge). If both are true, the limiter circuit 104 may reduce the sharpening of the sharpened images received in the signal SHRP using the original image samples received in the signal ORG.

Figure 3:
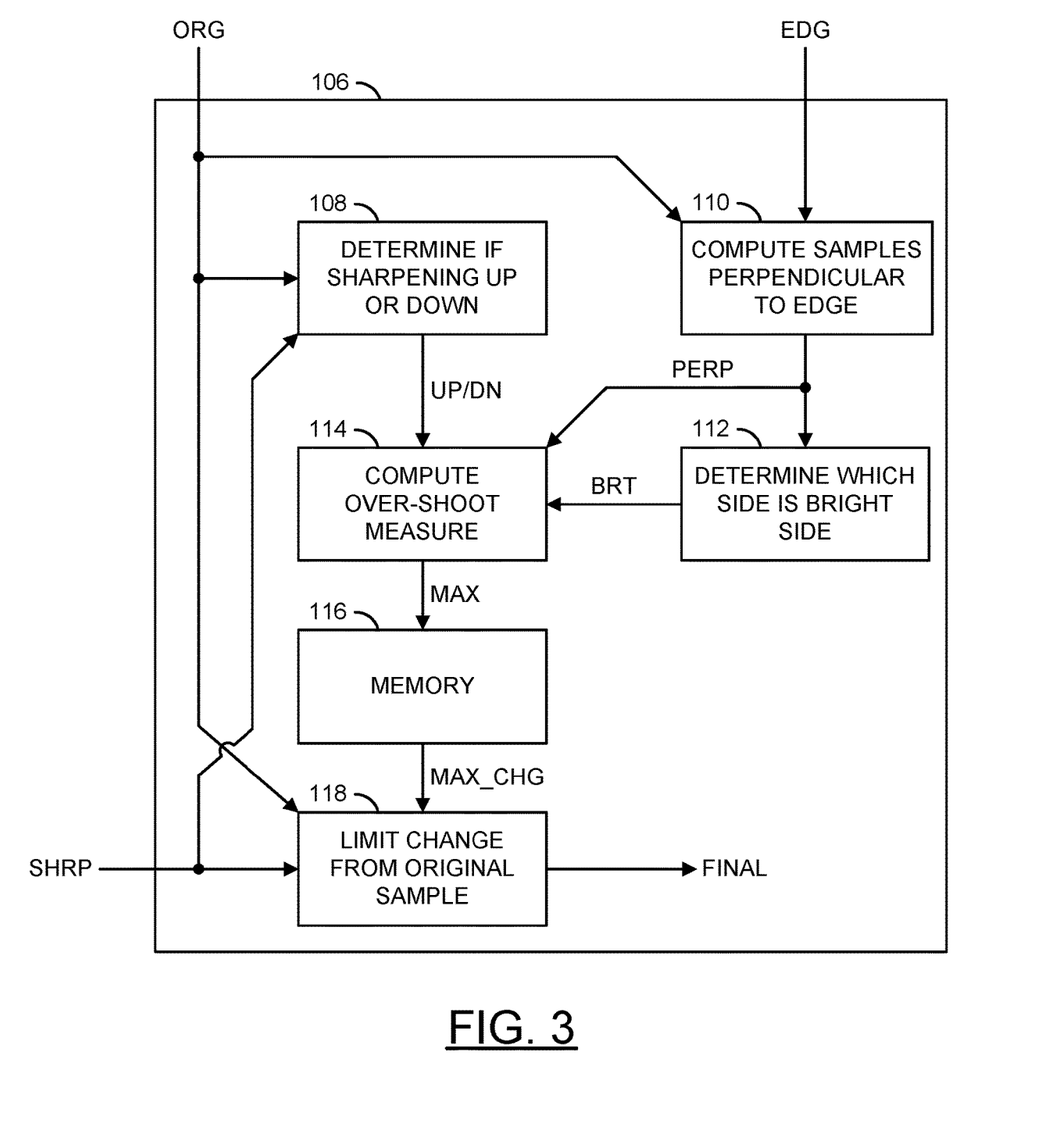
FIG. 3 is a block diagram of a limiter circuit.

Referring to FIG. 3, a block diagram of an example implementation of the limiter circuit 104 is shown. The limiter circuit 104 generally comprises a block (or circuit) 108, a block (or circuit) 110, a block (or circuit) 112, a block (or circuit) 114, a block (or circuit) 116 and a block (or circuit) 118. The circuits 108 to 118 may be implemented in hardware, software, firmware or any combination thereof in an apparatus.

The signal ORG may be received by the circuits 108, 110 and 118. The signal EDG may be received by the circuit 110. The signal SHRP may be received by the circuits 108 and 118. The circuit 118 may generate the signal FINAL. A signal (e.g., UP/DN) may be generated by the circuit 108 and presented to the circuit 112, The signal UP/DN generally identifies if the edge sharpening is an increase (up) or decrease (down) in the local brightness. A signal (e.g., PERP) may be generated by the circuit 110 and presented to the circuits 112 and 114. The signal PERP may convey samples perpendicular to the edge. A signal (e.g., BRT) may be generated by the circuit 114 and transferred to the circuit 112. The signal BRT may identify which side of the edge is the bright side. A signal (e.g., MAX) may be generated by the circuit 114 and received by the circuit 116. The signal MAX may be an index value of a maximum value used to address a lookup table. The circuit 116 may generate a signal (e.g., MAX_CHG) transferred to the circuit 118. The signal MAX_CHG may convey a limit for a maximum change in the sharpening.

The circuit 108 may be operational to determine if the sharpening direction is up or down. The direction may be determined by looking if the sharpening result in the signal SHRP has a higher luminance value or a lower luminance value, respectively, than the pre-sharpened result in the signal ORG. For up sharpening, potential overshoots may be limited. For down sharpening, potential undershoots may be limited. The direction results may be presented in the signal UP/DN.

The circuit 110 may be operational to generate and/or identify samples in a line segment perpendicular to the detected edge based on the edge information received in the signal EDG. The generated/identified samples may extend a pre-determined number of integer pixels (e.g., 7 pixels) away from the edge in one or both directions. The current sample being considered for sharpening may be the center sample.

Figure 4:
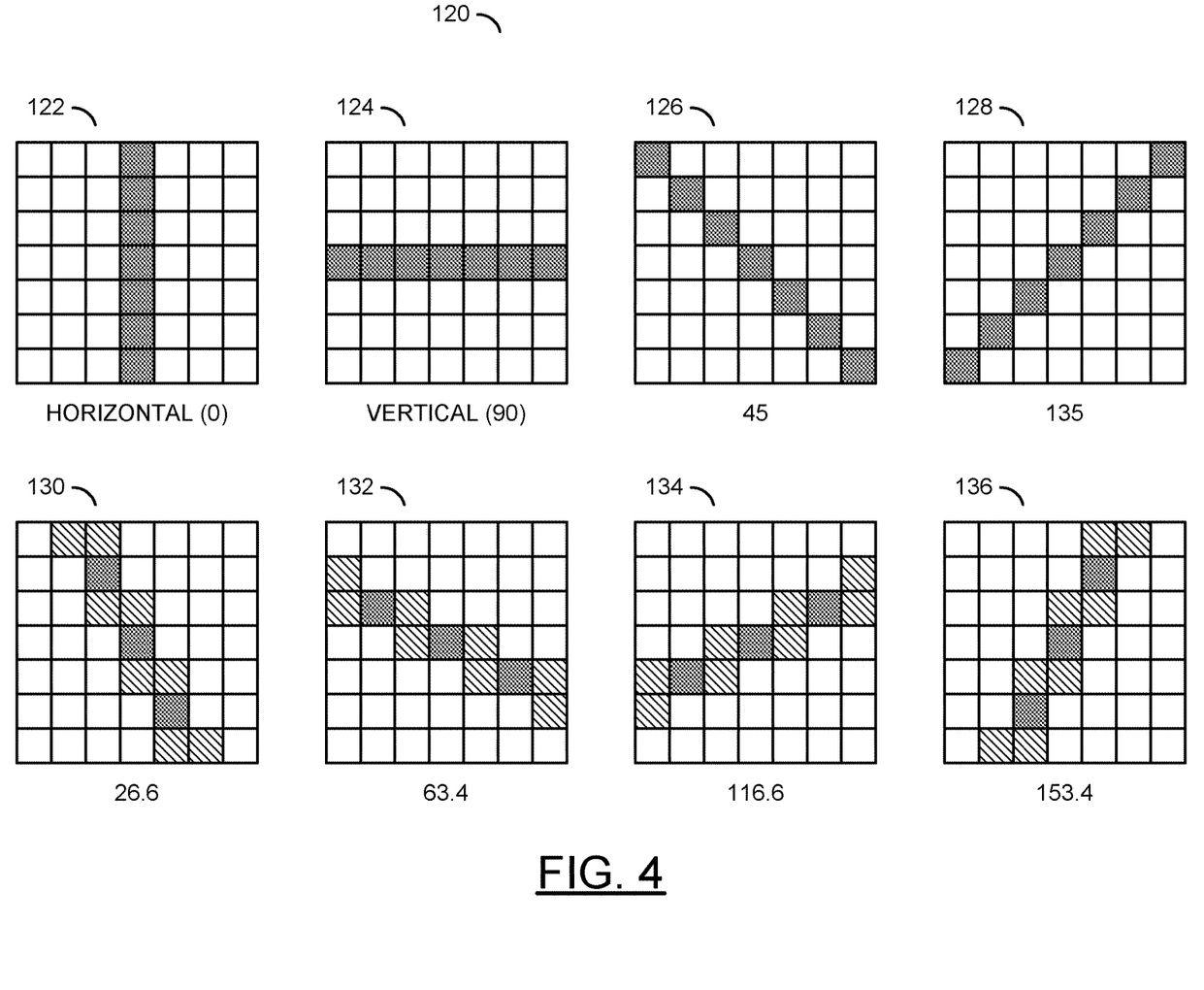
FIG. 4 is a set of diagrams of samples perpendicular to edges at several angles.

Referring to FIG. 4, sets of diagrams of example samples perpendicular to edges at several angles is shown. Each black square may indicate a sample at an integer pel location and used directly as one of the several samples in the line segment. Each adjacent pair of grey squares may be neighboring samples averaged together to calculate one of the several samples at a ½ pel location in the line segment. Diagrams 122 and 124 generally show the samples for a horizontal edge (zero degrees) and a vertical edge (90 degrees), respectively. Diagrams 126 and 128 generally show the samples for edge directions of 45 degrees and 135 degrees, respectively. Diagrams 130 to 136 may illustrate the sample for edge directions of 26.6 degrees, 63.4 degrees, 116.6 degrees and 153.4 degrees, respectively. For the purpose of discussion, the several samples may be treated as being ordered from left to right.

Returning to FIG. 3, the circuit 112 may be operational to determine a side of the edge that is bright and a side of the edge that is dark by using the line of samples received in the signal PERP. In some embodiments, if a sum of the left two samples is greater than a sum of the right two samples, the left side may be considered as the "bright" side and the right side may be the "dark" side. Otherwise, the left side may be considered the "dark" side and the right side may be considered the "bright" side. The left/right side determined to be bright may be identified in the signal BRT.

The circuit 114 may be operational to calculate a measure of overshoot or undershoot. Multiple (e.g., four) possible scenarios may be considered where the right side is the "bright" side or the "dark" side, and center sample being a potential undershoot or overshoot. The method used for any of the scenarios is generally the same, with appropriate changes, as another method.

In the first scenario (e.g., scenario A) where the right side is "dark", the circuit 114 may determine that the center sample to be sharpened is a potential overshoot if a subset of the samples that includes the center sample and all samples (or pixels) to the left of the center sample are materially brighter than a subset of samples to the right of the center sample.

In the second scenario (e.g., scenario B) where the right side is "bright", the circuit 114 may determine that the center sample is a potential overshoot if a subset of the samples that includes the center sample and all samples to the right of the center sample are materially brighter than a subset of the samples to the left of the center sample.

In the third scenario (e.g., scenario C) where the right side is "dark", the circuit 114 may determine that the center sample is a potential undershoot if a subset of samples that includes the center sample and all samples to the left of the center sample are materially darker than a subset of the samples to the right of the center sample.

In the fourth scenario (e.g., scenario D) where the right side is "bright", the circuit 114 may determine that the center sample is a potential undershoot if a subset of the samples that includes the center sample and all samples to the right of the center sample are materially darker than a subset of the samples to the left of the center sample.

Figure 5:
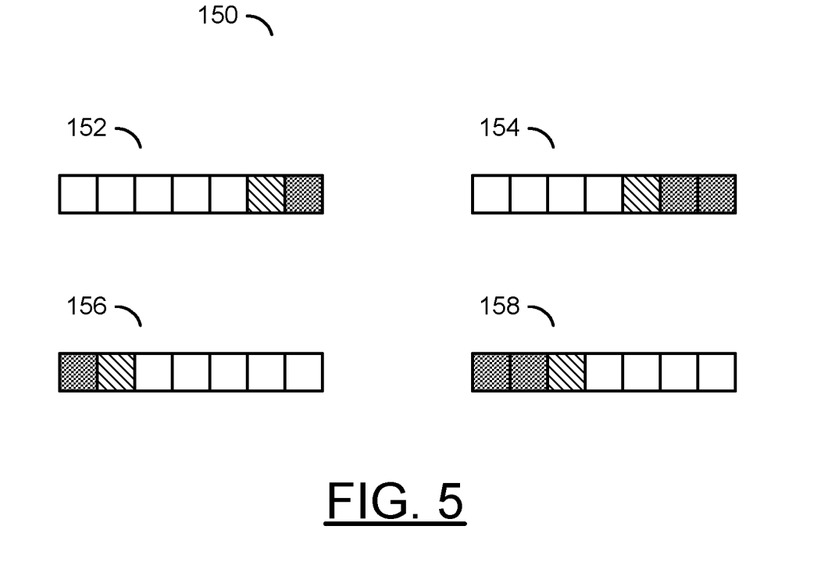
FIG. 5 is a diagram of potential overshoot distributions.

Referring to FIG. 5, a diagram 150 of example potential overshoot distributions are shown. The diagram 150 generally illustrates four distribution groups 152 to 158. In distribution groups 152 (e.g., scenario A case 1) and 154 (e.g., scenario A case 2), the left side of the line segment may be considered bright. In distribution groups 156 (e.g., scenario B case 1) and 158 (e.g., scenario B case 2), the left side of the line segment may be considered dark. A white square generally indicates a sample evaluated as potentially bright sample. A black square may indicate a sample evaluated as potentially dark sample. A grey square generally indicates a sample that is not evaluated as potentially dark or bright (e.g., do not care if bright or dark, not used in computations).

Figure 6:
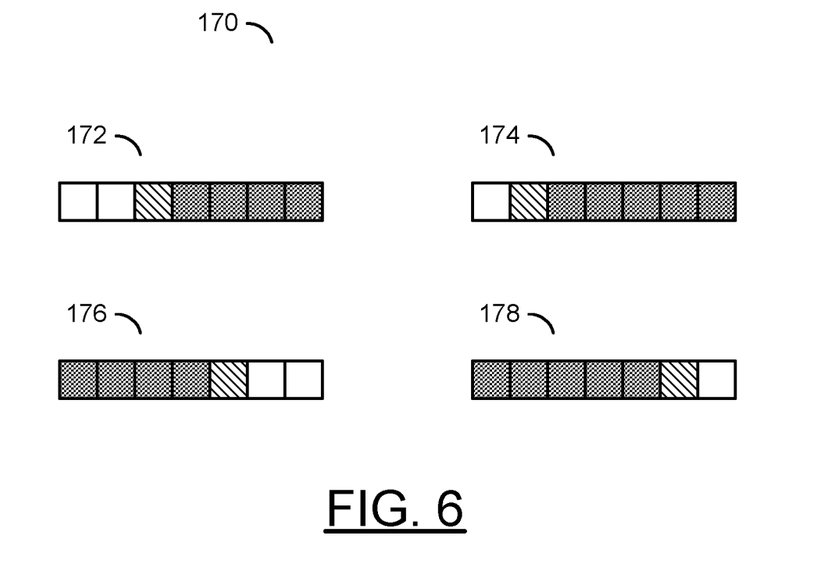
FIG. 6 is a diagram of potential undershoot distributions.

Referring to FIG. 6, a diagram 170 of example potential undershoot distributions are shown. The diagram 170 generally illustrates four distribution groups 172 to 178. In distribution groups 172 (e.g., scenario C case 1) and 174 (e.g., scenario C case 2), the left side of the line segment may be considered bright. In distribution groups 176 (e.g., scenario D case 1) and 178 (e.g., scenario D case 2), the left side of the line segment may be considered dark. A white square generally indicates a sample evaluated as potentially bright sample. A black square may indicate a sample evaluated as potentially dark sample. A grey square generally indicates a sample that is not evaluated as potentially dark or bright (e.g., do not care if bright or dark, not used in computations).

The multiple scenarios A to D generally look to see if one set of the samples is materially brighter than another set of the samples. In some situations, multiple distribution groups of the samples (e.g., both case 1 and case 2) may be considered. The distribution groups 152 to 158 and 172 to 178 may be used by the limiter circuit 106 to compute a maximum change amount for sharpening. A smaller maximum amount of change generally means the stronger the effect. In embodiments where multiple cases (e.g., case 1 and case 2) are considered, the case with the stronger limiting effect may be selected.

Returning to FIG. 3, in various embodiments the following computations may be performed by the circuit 114. After the correct scenario (A, B, C or D) is identified, a value M1 may be a minimum white value minus a maximum black value for case 1, and a value M2 may be a minimum white value minus a maximum black value for case 2. A value Max M may be maximum value between the value M1 and the value M2. An intermediate value A1 may be the value Max M minus a programmable parameter. The programmable parameter may be adjustable to make the filtering stronger or weaker. The value A1 may be clamped within a range of values (e.g., 0 to 127). The value A1 may be presented in the signal MAX by the circuit 114.

The circuit 116 may be implemented as a memory circuit. In various embodiments, the memory circuit 116 may be configured as a lookup table with entry slots accessed by the value A1 in the signal MAX. Each entry slot in the lookup table generally contains parameters that control how strongly to limit the sharpening. The parameters may be different for undershoots than for overshoots. In some embodiments, the memory circuit 116 may include an parameter for each possible value A1 (e.g., 128 parameters). In other embodiments, the memory circuit 116 may include a smaller number of parameters (e.g., 16 parameters) than all possible values A1. In such cases, the memory circuit 116 may be operational to interpolate between parameters to derive an entry suitable for the value A1. For example, where a value A1 is logically half way between two entry slots, the memory circuit 116 may interpolate the parameters in the two entry slots to create a new parameter appropriate for the value A1. If the value A1 is logically closer to one of the two entry slots, the new parameter may be weighted more heavily in favor of the parameter in the closer entry slot. The parameters may be presented in the signal MAX_CHG.

The circuit 118 may be operational to limit the changes caused by the sharpening process of the sharpening circuit 102. For each sample received in the signal SHRP, the limiting circuit 118 may consider an original pre-sharpened sample (e.g., O), the sharpened sample (e.g., S), and the maximum allowable change (e.g., MAX_change) in the signal MAX_CHG. If up sharpening, a final value for the sharpened sample (e.g., F) may be a minimum value of either a sum of the original sample O and the maximum allowable change MAX_change, or the sharpened sample S per formula 1 as follows:

$$F=\mathrm{MIN}(O+\mathrm{Max\_change}, S) \quad (1)$$

If down sharpening, the final value for the sharpened sample may be a maximum value of either a difference between the original sample O and the maximum allowable change MAX_change, or the sharpened sample S per formula 2 as follows:

$$F=\mathrm{MAX}(O-\mathrm{Max\_change}, S) \quad (2)$$

Other limiting methods may be implemented to meet the design criteria of a particular application.

In various embodiments, the sharpening may be allowed as-is or limited based on evaluations of several pixels neighboring the edges and along the perpendicular line segments. If the brightness increases or decreases significantly and stays increased/decreased for several pixels (e.g., 2, 3 or 4 pixels), the increase/decrease may be a halo caused by the sharpening. In such situations, the sharpening may be weakened by the limiting circuit 118 to remove or reduce the halo effect. Consider the distribution group 152 (FIG. 5) as an example. If all of the white pixels on the left side of the distribution group 152 including the center pixel are significantly brighter than the black pixels on the right side of the distribution group 152, the limiting circuit 118 may undo the sharpening of the current pixel to reduce or remove the halo effect. Otherwise, the limiting circuit 118 may leave the current pixel as sharpened. Similar situations exist where the dark pixels on the right side of the distribution group including the center pixel are significantly darker than the bright pixels on the left side of the distribution group. Likewise, the left side and the right side may be reversed with the significantly brighter pixels on the right side and/or the significantly darker pixels on the left side.

In another embodiment, the parameters stored in the lookup table in the memory circuit 116 may be programmed in a range of zero to one (unity) as scale values (e.g., SCALE). The signal MAX_CHG may thus operate as a scaling signal. The limiting circuit 118 may calculate the final sharpened sample value per formula 3 as follows:

$$F=\mathrm{SCALE} \times (S-O)+O \quad (3)$$

Figure 7:
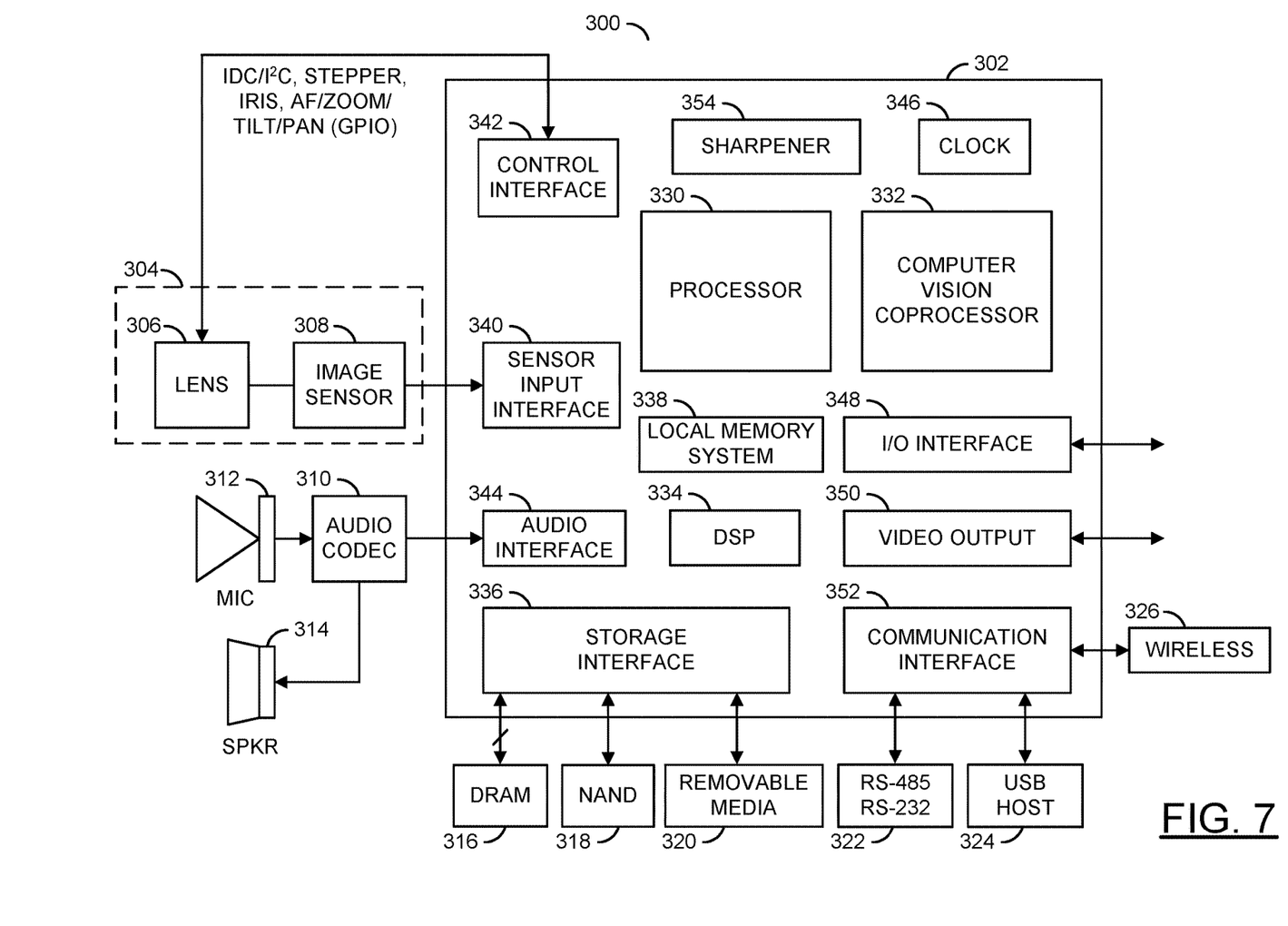
FIG. 7 is a diagram of a camera system illustrating a computer vision system.

Referring to FIG. 7, a diagram of a camera system 300 is shown illustrating an example implementation of a computer vision system in accordance with an embodiment of the invention. In one example, the electronics of the camera system 300 may be implemented as one or more integrated circuits. In an example, the camera system 300 may be built around a processor/camera chip (or circuit) 302. In an example, the processor/camera chip 302 may be implemented as an application specific integrated circuit (ASIC) or system on chip (SOC). The processor/camera circuit 302 generally incorporates hardware and/or software/firmware that may be configured to implement the processors, circuits, and processes described above in connection with FIG. 1 through FIG. 6.

In an example, the processor/camera circuit 302 may be connected to a lens and sensor assembly 304. In some embodiments, the lens and sensor assembly 304 may be a component of the processor/camera circuit 302 (e.g., a SoC component). In some embodiments, the lens and sensor assembly 304 may be a separate component from the processor/camera circuit 302 (e.g., the lens and sensor assembly may be an interchangeable component compatible with the processor/camera circuit 302). In some embodiments, the lens and sensor assembly 304 may be part of a separate camera connected to the processor/camera circuit 302 (e.g., via a video cable, a high definition media interface (HDMI) cable, a universal serial bus (USB) cable, an Ethernet cable, or wireless link).

The lens and sensor assembly 304 may comprise a block (or circuit) 306 and/or a block (or circuit) 308. The circuit 306 may be associated with a lens assembly. The circuit 308 may be an image sensor. The lens and sensor assembly 304 may comprise other components (not shown). The number, type and/or function of the components of the lens and sensor assembly 304 may be varied according to the design criteria of a particular implementation.

The lens assembly 306 may capture and/or focus light input received from the environment near the camera 300. The lens assembly 306 may capture and/or focus light for the image sensor 308. The lens assembly 306 may implement an optical lens. The lens assembly 306 may provide a zooming feature and/or a focusing feature. The lens assembly 306 may be implemented with additional circuitry (e.g., motors) to adjust a direction, zoom and/or aperture of the lens assembly 306. The lens assembly 306 may be directed, tilted, panned, zoomed and/or rotated to provide a targeted view of the environment near the camera 300.

The image sensor 308 may receive light from the lens assembly 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens assembly 306. The image sensor 308 may present converted image data as a color filter array (CFA) formatted bitstream. The processor/camera circuit 302 may transform the bitstream into video data, video files and/or video frames (e.g., human-legible content).

The processor/camera circuit 302 may also be connected to (i) an optional audio input/output circuit including an audio codec 310, a microphone 312, and a speaker 314, (ii) a memory 316, which may include dynamic random access memory (DRAM), (iii) a nonvolatile memory (e.g., NAND flash memory) 318, a removable media (e.g., SD, SDXC, etc.) 320, one or more serial (e.g., RS-485, RS-232, etc.) devices 322, one or more universal serial bus (USB) devices (e.g., a USB host) 324, and a wireless communication device 326.

In various embodiments, the processor/camera circuit 302 may comprise a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346, a block (or circuit) 348, a block (or circuit) 350, a block (or circuit) 352 and/or a block (or circuit) 354. The circuit 330 may be a processor circuit. In various embodiments, the circuit 330 may include one or more embedded processors (e.g., ARM, etc.). The circuit 332 may be a computer vision coprocessor circuit. The circuit 334 may be a digital signal processing (DSP) module. In some embodiments, the circuit 334 may implement separate image DSP and video DSP modules. The circuit 336 may be a storage interface. The circuit 336 may interface the processor/camera circuit 302 with the DRAM 316, the nonvolatile memory 318, and the removable media 320.

The circuit 338 may implement a local memory system. In some embodiments, the local memory system 338 may include, but is not limited to a cache (e.g., L2CACHE), a direct memory access (DMA) engine, graphic direct memory access (GDMA) engine, and fast random access memory. The circuit 340 may implement a sensor input (or interface). The circuit 342 may implement one or more control interfaces including but not limited to an inter device communication (IDC) interface, an inter integrated circuit ($I^2C$) interface, a serial peripheral interface (SPI), and a pulse width modulation (PWM) interface. The circuit 344 may implement an audio interface (e.g., an $I^2S$ interface, etc.). The circuit 346 may implement a clock circuit including but not limited to a real time clock (RTC), a watchdog timer (WDT), and/or one or more programmable timers. The circuit 348 may implement an input/output (I/O) interface. The circuit 350 may be a video output module. The circuit 352 may be a communication module. The circuits 330 through 352 may be connected to each other using one or more buses, interfaces, traces, protocols, etc.

The circuit 318 may be implemented as a nonvolatile memory (e.g., NAND flash memory, NOR flash memory, etc.). The circuit 320 may comprise one or more removable media cards (e.g., secure digital media (SD), secure digital extended capacity media (SDXC), etc.). The circuit 322 may comprise one or more serial interfaces (e.g., RS-485, RS-232, etc.). The circuit 324 may be an interface for connecting to or acting as a universal serial bus (USB) host. The circuit 326 may be a wireless interface for communicating with a user device (e.g., a smart phone, a computer, a tablet computing device, cloud resources, etc.). In various embodiments, the circuits 304-326 may be implemented as components external to the processor/camera circuit 302. In some embodiments, the circuits 304-326 may be components on-board the processor/camera circuit 302.

The control interface 342 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens assembly 306. The interface 342 may enable the processor/camera circuit 302 to control the lens and sensor assembly 304.

The storage interface 336 may be configured to manage one or more types of storage and/or data access. In one example, the storage interface 336 may implement a direct memory access (DMA) engine and/or a graphics direct memory access (GDMA). In another example, the storage interface 336 may implement a secure digital (SD) card interface (e.g., to connect to the removable media 320). In various embodiments, programming code (e.g., executable instructions for controlling various processors and encoders of the processor/camera circuit 302) may be stored in one or more of the memories (e.g., the DRAM 316, the NAND 318, etc.). When executed by the processor 330, the programming code generally causes one or more components in the processor/camera circuit 302 to configure video synchronization operations and start video frame processing operations. The resulting compressed video signal may be presented to the storage interface 336, the video output 350 and/or communication interface 352. The storage interface 336 may transfer program code and/or data between external media (e.g., the DRAM 316, the NAND 318, the removable media 320, etc.) and the local (internal) memory system 338.

The sensor input 340 may be configured to send/receive data to/from the image sensor 308. In one example, the sensor input 340 may comprise an image sensor input interface. The sensor input 340 may be configured to transmit captured images (e.g., picture element, pixel, data) from the image sensor 308 to the DSP module 334, the processor 330 and/or the coprocessor 332. The data received by the sensor input 340 may be used by the DSP 334 to determine a luminance (Y) and chrominance (U and V) values from the image sensor 308. The sensor input 340 may provide an interface to the lens and sensor assembly 304. The sensor input interface 340 may enable the processor/camera circuit 302 to capture image data from the lens and sensor assembly 304.

The audio interface 344 may be configured to send/receive audio data. In one example, the audio interface 344 may implement an audio inter-IC sound ($I^2S$) interface. The audio interface 344 may be configured to send/receive data in a format implemented by the audio codec 310.

The DSP module 334 may be configured to process digital signals. The DSP module 334 may comprise an image digital signal processor (IDSP), a video digital signal processor DSP (VDSP) and/or an audio digital signal processor (ADSP). The DSP module 334 may be configured to receive information (e.g., pixel data values captured by the image sensor 308) from the sensor input 340. The DSP module 334 may be configured to determine the pixel values (e.g., RGB, YUV, luminance, chrominance, etc.) from the information received from the sensor input 340. The DSP module 334 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 348 may be configured to send/receive data. The data sent/received by the I/O interface 348 may be miscellaneous information and/or control data. In one example, the I/O interface 348 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 350 may be configured to send video data. For example, the processor/camera circuit 302 may be connected to an external device (e.g., a TV, a monitor, a laptop computer, a tablet computing device, etc.). The video output module 350 may implement a high-definition multimedia interface (HDMI), a PAL/NTSC interface, an LCD/TV/Parallel interface and/or a DisplayPort interface.

The communication module 352 may be configured to send/receive data. The data sent/received by the communication module 352 may be formatted according to a particular protocol (e.g., Bluetooth®, ZigBee®, USB, Wi-Fi, UART, etc.). In one example, the communication module 352 may implement a secure digital input output (SDIO) interface. The communication module 352 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 352 may also include support for communicating using one or more of the universal serial bus protocols (e.g., USB 1.0, 2.0, 3.0, etc.). The processor/camera circuit 302 may also be configured to be powered via a USB connection. However, other communication and/or power interfaces may be implemented accordingly to meet the design criteria of a particular application.

The processor/camera circuit 302 may be configured (e.g., programmed) to control the one or more lens assemblies 306 and the one or more image sensors 308. The processor/camera circuit 302 may receive raw image data from the image sensor(s) 308. The processor/camera circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 302 may receive encoded and/or uncoded (e.g., raw) audio data at the audio interface 344. The processor/camera circuit 302 may also receive encoded audio data from the communication interface 352 (e.g., USB and/or SDIO). The processor/camera circuit 302 may provide encoded video data to the wireless interface 326 (e.g., using a USB host interface). The wireless interface 326 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 302 may also include support for communication using one or more of the universal serial bus protocols (e.g., USB 1.0, 2.0, 3.0, etc.).

The circuit 354 may implement the sharpener circuit 100. The sharpener circuit 354 is generally operational to apply a sharpening technique to the images with edge-detection based undershoot and overshoot reduction. The undershoot and overshoot reductions may minimize unwanted artifacts caused by the sharpening.

The functions and structures illustrated in the diagrams of FIGS. 1 to 7 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a first circuit configured to (i) receive an image, (ii) generate a sharpened region by sharpening an original region of said image and (iii) generate edge information by detecting an edge in said original region of said image; and
   a second circuit configured to (i) receive said image, (ii) compare said original region of said image to said sharpened region to determine whether a sharpening result of a current sample in said original region is an overshoot or an undershoot, (iii) generate a line segment in said original region perpendicular to said detected edge, (iv) determine a result of whether (a) said current sample in said original region is a number of pixels away from said detected edge and (b) said detected edge has a contrast, (v) apply a limit on sharpening said current sample in said original region to generate a final sharpened current sample if the determination of said result is true and, (vi) use said sharpened result of said current sample as said final sharpened current sample if said result is not true, wherein
      said contrast is determined based on said line segment, said line segment is determined based on said edge information; and
      said limit applied is selected in response to parameters in a lookup table based on an amount of said overshoot or said undershoot.

2. The apparatus according to claim 1, wherein said second circuit is further configured to apply said limit based on a direction of said detected edge.

3. The apparatus according to claim 1, wherein said second circuit is further configured to evaluate said current sample in said original region based on a plurality of neighboring samples in said sharpened region along said line segment.

4. The apparatus according to claim 3, wherein (i) said second circuit is further configured to evaluate each of said neighboring samples along said line segment as one of a potentially bright sample, a potentially dark sample and a do-not-care sample, and (ii) a change to said current sample is made based on one or more distribution groups of said evaluations of said neighboring samples.

5. The apparatus according to claim 1, wherein said second circuit is further configured to adjust said current sample in said original region to within a change value from a co-located current sample in said original region.

6. The apparatus according to claim 1, wherein said second circuit (i) determines said overshoot when said current sample is on a bright side of said line segment and (ii) determines said undershoot when said current sample is on a dark side of said line segment.

7. The apparatus according to claim 1, wherein said number of pixels is at least two.

8. The apparatus according to claim 1, wherein said second circuit is further configured to generate said final sharpened current sample to match said original region when the determination of said result is false.

9. The apparatus according to claim 1, wherein said apparatus forms part of a digital camera.

10. The apparatus according to claim 1, wherein said line segment defines an integer number of pixels away from the detected edge.

11. The apparatus according to claim 10, wherein said line segment is defined as a plurality of samples taken at a pixel location adjacent to said detected edge.

12. A method for dynamic image sharpening, comprising the steps of:
    generating a sharpened region by sharpening an original region of an image using a circuit;
    generating edge information by detecting an edge in said original region of said image;
    comparing said original region of said image to said sharpened region to determine whether a sharpening result of a current sample in said original region is an overshoot or an undershoot;
    generating a line segment in said original region perpendicular to said detected edge;
    determining a result of whether (a) said current sample in said original region is a number of pixels away from said detected edge and (b) said detected edge has a contrast;
    applying a limit on sharpening said current sample in said original region to generate a final sharpened current sample if said result is true; and
    using said sharpened result of said current sample as said final sharpened current sample if said result is not true,
    wherein said contrast is determined based on said line segment, said line segment is determined based on said edge information and said limit applied is selected in response to parameters in a lookup table based on an amount of said overshoot or said undershoot.

13. The method according to claim 12, wherein said original region is adjusted based on a direction of said detected edge.

14. The method according to claim 12, wherein an evaluation of said current sample in said original region is based on a plurality of neighboring samples in said sharpened region along a line segment perpendicular to said detected edge.

15. The method according to claim 14, wherein (i) each of said neighboring samples along said line segment is evaluated as one of a potentially bright sample, a potentially dark sample and a do-not-care sample, and (ii) a change to said current sample is made based on one or more distribution groups of said evaluations of said neighboring samples.

16. The method according to claim 12, wherein an adjustment of said current sample in said original region is within a change value from a co-located current sample in said original region.

17. The method according to claim 12, wherein said number of pixels is at least two.

18. The method according to claim 12, further comprising the step of:
    generating said final sharpened current sample to match said current sample when the determination of said result is false.

19. The method according to claim 12, wherein the steps are performed in a digital camera.

* * * * *